United States Patent [19]

Richey et al.

[11] Patent Number: 5,171,589
[45] Date of Patent: Dec. 15, 1992

[54] COATED CHEWING GUN PRODUCTS POLISHED WITH COLORED WAX AND METHOD OF PREPARATION

[75] Inventors: Lindell C. Richey, Lake Zurich, Ill.; Alexander J. Naldrett, Devon, United Kingdom; Philip G. Schnell, Downers Grove, Ill.

[73] Assignee: Wm. Wrigley Jr. Company, Chicago, Ill.

[21] Appl. No.: 708,663

[22] Filed: May 31, 1991

[51] Int. Cl.$^5$ .............................................. A23G 3/30
[52] U.S. Cl. .......................................... 426/5; 426/3; 426/305
[58] Field of Search ................... 426/3, 5, 103, 302, 426/303, 305, 548

[56] References Cited

U.S. PATENT DOCUMENTS

| | | |
|---|---|---|
| 4,001,390 | 1/1977 | Ohno et al. . |
| 4,105,801 | 8/1978 | Dogliotti . |
| 4,127,677 | 11/1978 | Fronczkowski et al. ............... 426/5 |
| 4,238,510 | 12/1980 | Cherukuri et al. . |
| 4,250,195 | 2/1981 | Cherukuri et al. . |
| 4,274,830 | 6/1981 | Woznicki et al. . |
| 4,336,244 | 6/1982 | Woznicki et al. . |
| 4,475,919 | 10/1984 | Woznicki et al. . |
| 4,681,766 | 7/1987 | Huznec et al. . |
| 4,725,411 | 2/1988 | Porter et al. . |
| 4,753,790 | 6/1988 | Silva et al. .......................... 426/5 X |
| 4,786,511 | 11/1988 | Huznec et al. . |
| 4,792,453 | 12/1988 | Reed et al. . |
| 4,802,924 | 2/1989 | Woznicki et al. . |
| 4,828,841 | 5/1989 | Porter et al. . |
| 4,828,845 | 5/1989 | Zamudio-Tena et al. ............... 426/5 |
| 4,931,286 | 6/1990 | Johnson et al. . |
| 4,936,369 | 10/1990 | Song et al. . |

FOREIGN PATENT DOCUMENTS

| | | |
|---|---|---|
| 0288909 | 11/1988 | European Pat. Off. . |
| 0415656A2 | 3/1991 | European Pat. Off. . |
| 3043914A1 | 11/1984 | Fed. Rep. of Germany . |
| WO87/07902 | 12/1987 | PCT Int'l Appl. . |
| 872848 | 4/1987 | South Africa . |

OTHER PUBLICATIONS

The Evolution of Chewing Gum, Xylitol and the Prevention of Dental Caries, Xyrofin, Clarastrasse 12, CH-4005, Basel. Mar., 1985.

Silesia Confiserie Manual #2, K. W. Stock and A. Meiners. Special Handbook for Dragee Production. Norf/West Germany, 1973, pp. 404-406, 411-414.

*Primary Examiner*—Joseph Golian
*Assistant Examiner*—Leslie Wong
*Attorney, Agent, or Firm*—Willian Brinks Olds Hofer Gilson & Lione

[57] ABSTRACT

A method for making a coated chewing gum product and the resulting product are disclosed. The product includes a gum center surrounded by a colored coating. A polishing layer is applied to the colored coating. The polishing layer comprises wax and a colorant. In preferred embodiments, the colorant comprises about 1% to about 30% of the polishing layer, and the polishing layer comprises about 0.005% to about 0.2% of the coated product.

20 Claims, No Drawings

COATED CHEWING GUN PRODUCTS POLISHED WITH COLORED WAX AND METHOD OF PREPARATION

BACKGROUND OF THE INVENTION

The present invention relates to coated chewing gum products, and more particularly to gum products that are coated with a colored coating and a wax polishing layer.

One common form of chewing gum is a coated pellet. The gum may be coated with either sugar or sugarless coatings by a process known as panning. In panning, a coating solution is applied to gum centers and dried in repeated steps to build up a layer of the coating. Panning may be hard panning or soft panning, the difference generally being that in soft panning, powdered sweeteners are added between successive applications of coating solution to help build up the layer and dry the solution. The coating produced may be either smooth or have a mottled appearance; and is often colored.

Common coating materials include sugars like sucrose and dextrose. Sugarless coating materials have been more common in the recent including sorbitol, xylitol and hydrogenated isomaltulose (Palatinit ®*). U.S. Pat. Nos. 4,127,677; 4,681,766; 4,786,511 and 4,828,845 disclose xylitol coating processes for gum centers.

Hard panning is very vigorous and the coating must have sufficient strength to withstand the coating process as the layer builds up. * Registered Trademark of Palatinit Sussungsmittel GmbH This is usually accomplished by using high levels of sugars or sugarless sweeteners in the coating solution. To keep the panning stress to a minimum, the coating solution is applied and dried quickly. However, high sugar concentrations and fast drying cause a rough surface. Panning procedures for sugar coatings have been carefully developed over the years to balance the vigorous panning steps to obtain a smooth, even surface without too much pellet damages. In some cases, additives such as gum arabic are used to strengthen the dried crystals of sugar on the surface, but this causes more roughness.

When xylitol is used in the coating, its crystal is much softer and requires a high level of gum arabic to toughen the coating, as well as the use of even higher concentrations of xylitol solutions. As a result, a xylitol coating may not be as smooth as a sugar coating, resulting in a rough surface. For a white pellet, these rough surface imperfections can be reduced with the use of a whitener like titanium dioxide, calcium carbonate or talc. However, for a colored coated pellet, the rough surface imperfections cause the color to look mottled and uneven, giving an unpleasant appearance.

Another problem associated with xylitol coating is that xylitol dries very quickly, and too quickly in the final coating steps. This causes some white dusting of the product in the final steps. This white dusting is not a problem for white products, but is a problem for colored products, giving them an uneven, spotted appearance.

A coated pellet gum is often polished by using a micronized or fine powdered carnauba wax sprinkled onto the gum surface and tumbled with the pellet in a coating pan. Carnauba wax polishing is done with hard panned gum to give it a pleasant appearance and help pellets flow through high speed wrapping equipment.

There are several patents that disclose a variety of sugar and sugarless coatings for chewing gum and other comestibles. For example, U.S. Pat. No. 4,238,510 to Cherukuri et al. discloses a sugarless coating containing sorbitol in crystalline form. The process uses a "soft panning" technique, where a dusting mix of powdered sweetener is added to help absorb moisture in the coating syrup. Binding components and film forming components are included in the coating syrup. Anti-sticking components and moisture absorbing components are included in the dusting mix.

U.S. Pat. No. 4,250,195 to Cherukuri et al. discloses a method of applying a soft flexible sugar coating to fresh chewing gum. A "soft panning" technique is used, wherein a dusting mix is applied to the gum centers after the first coating syrup is applied. Although the gum is coated while it is soft, the coating is also soft, though gum arabic in the coating is said to ensure that the coating hardens after four weeks.

U.S. Pat. No. 4,753,790 to Silva et al. discloses a sorbitol coated comestible such a chewing gum. The coating solution comprises a saturated sorbitol solution, crystalline sorbitol powder, one or more film forming agents and one or more crystallization retardants. Optionally the coating solution includes binders, plasticizers and moisture adsorbents.

U.S. Pat. No. 4,828,845 to Zamudio.Tena et al. discloses a xylitol coated comestible such as chewing gum. This patent discloses the use of film forming agents, binders and optional fillers and plasticizers in the coating syrups.

U.S. Pat. No. 4,802,924 to Woznicki et al. discloses a polydextrose-based coating material for, inter alia, chewing gum. The coating solution includes a detackifier such as lecithin or mineral oil.

U.S. Pat. No. 4,105,801 to Dogliotii discloses a coated edible product wherein the shell is formed of an intimate mixture of microcrystals of xylitol and a normally solid fatty substance. The fatty substance, such as cocoa butter, prevents the xylitol coating from transforming from a smooth shell to a cracked, rough structure. If the fatty substance is not itself an emulsifier, an emulsifier is optionally added to the coating. The coating may be applied to chewing gum.

EPO Publication No. 0 415 656 discloses a process for producing sorbitol coated comestibles capable of being dyed without the color fading or becoming mottled. Colorants are added to the coating syrup or applied to the gum pieces in between syrup coats. Also, sealing coats of natural and artificial food grade waxes, comprising 0.1 to 2% of the coating, are disclosed.

While these various patents disclose a variety of coating syrups or other coating compositions, none addresses the problem that the colored coating, even with the wax polish, is not as pleasing in appearance as it could be when optimum coating solutions and processes are used. This is primarily true for sugarless coatings. Thus, there is a need for a way to improve the appearance of colored coated gum products.

SUMMARY OF THE INVENTION

It has surprisingly been found that the use of a colored wax in the polishing step significantly improves the color appearance of colored coated pellet gum. To this end, the present invention includes a method of making coated chewing gum products comprising the steps of providing a gum center, coating the gum center with a colored coating and applying a polishing layer comprising a wax and a colorant to the colored coating. The invention also includes a coated chewing gum product having a colored coating surrounding a gum center and a polishing layer comprising a wax and a colorant applied to the surface of the colored coating.

In the preferred embodiment, the colored wax is only used at a level of about 0.01% to about 0.05% of the gum product, and the wax contains only about 10% colorant. However, even at this low level of colorant, the colored wax has been found to surprisingly improve the appearance of colored coated gum products.

DETAILED DESCRIPTION OF THE INVENTION AND PREFERRED EMBODIMENTS

As used herein the term chewing gum includes bubble gum and other like variants of chewing gum. Unless specified otherwise, all percentages are based on weight.

Gum compositions that may be used to make the chewing gum centers of the present invention are conventional, although the gum center should have a consistency hard enough for hard panning operations. U.S. Patent Application Ser. No. 07/676,832, incorporated herein by reference, discloses a procedure for applying a hydrated emulsifier as a subcoat in a panning operation so that a hard gum center can be used for panning, but the gum center will be softened later for chewing. The present invention may be used in conjunction with such a hydrated emulsifier subcoat procedure.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 80 percent by weight of the gum center. More preferably the insoluble gum base comprises between 10 and 60 percent by weight of the gum center, and most preferably about 20 to about 35 percent by weight of the gum center.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum center may further comprise sweeteners, softeners, flavoring agents and combinations thereof. The sweeteners often fulfill the roll of bulking agents in the gum. The sweeteners may be sugarless sweeteners such as sorbitol, mannitol, xylitol, hydrogenated starch hydrolysates, maltitol and the like, alone or in any combination. In sugar gums, typical bulking agents include sucrose, dextrose, maltose, dextrin, dried invert sugar, fructose, levulose, galactose, corn syrup solids and the like, alone or in combination. The bulking agent generally will comprise from about 5 percent to about 80 percent of the gum composition, and more preferably about 20 percent to about 70 percent of the gum composition.

Softeners are added to the chewing gum composition in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. In the gum centers of the present invention, such softeners are used at levels such that the gum center is hard enough to be hard panned without significant deformation.

A flavoring agent may be present in the chewing gum center in an amount within the range of from about 0.1 to about 10.0 weight percent, and preferably from about 0.5 to about 3.0 weight percent, of the gum composition. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, high-potency sweeteners and pharmaceutical agents may be added to the chewing gum used to make the gum center.

In general, chewing gum is manufactured by sequentially adding the various chewing gum ingredients to a commercially available mixer known in the art. After the ingredients have been thoroughly mixed, the gum mass is discharged from the mixer and shaped into the desired form, such as by rolling into sheets and cutting into chewing gum centers, forming into balls or casting into pellets.

Generally, the ingredients are mixed by first melting the gum base and adding it to the running mixer. The base may also be melted in the mixer itself. Color or emulsifiers may also be added at this time, along with a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

After gum is sheeted and broken into individual pellets, the pellets may be coated in conventional panning equipment. Conventional panning procedures and solutions may be used. These often include a grossing or covering syrup and later a finishing syrup.

Silesia Confiserie Manual #2, Special Handbook for Dragee Production provides information on panning procedures and materials. The coating may be formed primarily of a bulk sweetener such as sucrose, dextrose, sorbitol, xylitol or hydrogenated isomaltulose (Palatinit ®). The coating syrups may include a film forming agent, such as gum arabic. Colors such as dyes and lake pigments may be added to the coating syrup. For chewing gum, the coating will normally comprise about 20% to about 50%, and preferably about 30% to about 40%, of the product. After the colored coating is applied and dried, the polishing step is carried out using colored wax.

The colorant used may include dyes, pigments, lakes and natural colors. The colorant may be blended with melted wax, preferably carnauba wax, which melts at 80°–90° C., then cooled and ground to a fine particle size that will pass at least 99% through a #100 mesh sieve (less than 150 microns). Other waxes that may be used include beeswax, candelilla wax, spermaceti wax, and mixtures of the foregoing. Another method of blending is to powder blend the colorant with the wax. In either method, the preferred ratios are 1–30% colorant with 70.99% wax, and more preferably 5–15% colorant and 85–95% wax. It is preferably to use powdered colorants that have a particle size that will pass at least 99.9% through a #325 mesh sieve (smaller than 45 microns) so that the blended color/wax will still pass at least 99% through a #100 mesh sieve, having a particle size of 150 microns or less.

The fine powdered colored wax is sprinkled onto the coated gum pellets at a level of about 0.005% to 0.2%, preferably about 0.01% to 0.05%, by weight of coated pellets. At 10% colorant in wax, the more preferred ratios would yield a colorant level of about 0.001% to 0.005%, or 10 to 50 ppm, by weight of the product. The amount of dye color in a lake colorant is usually about 10%, which would yield a polishing layer dye level of about 1 to 5 ppm in the final product.

EXAMPLE 1 (COMPARATIVE)

The following procedure describes the production scale pan coating of a green colored coated gum, using xylitol. A 54 kg quantity of sugarfree pellet gum was coated with xylitol in a standard 36" coating pan. Xylitol was prepared in two solutions. (A) Covering solution: 75% xylitol solution in water at 110° C. was blended with a 33% aqueous solution of gum arabic at a 4:1 ratio. To this was added 60 grams of a powdered colorant (a proprietary TLB blend from Colorcon, Inc., West Point, PA) containing titanium dioxide, FD&C Blue #1 Lake, and FD&C Yellow #5 Lake. (B) Finishing solution: 70% xylitol solution in water at 110° C. was blended with a 33% aqueous solution of gum arabic at a 12:1 ratio. To this was added 180 grams of the colorant used in the covering solution.

The covering solution was applied to the pellets in successive coating and drying steps until a coating was built up to a level of about a 30% increase in pellet weight. About half way through the coating steps, about 140 grams of mint flavor was added and covered with the covering solution. The finishing solution was coated onto the gum until the product weight was increased another 20%, giving a 34% coating on the total gum product. The result was a colored hard shell xylitol coating on the gum centers.

EXAMPLE 2 (COMPARATIVE)

750 grams of green colored xylitol coated pellets of Example 1 were polished in a cloth-coated, lab-size polishing pan with 1 gram of 100 mesh powdered carnauba wax - (0.13% wax).

EXAMPLE 3

47.5 grams of melted carnauba wax were blended with 2.5 grams of the colorant used in the covering solution of Example 1 (containing titanium dioxide, FD&C Blue #1 Lake, and FD&C Yellow #5 Lake). After cooling, this 5% color/wax blend was ground to pass through a #100 mesh sieve. 750 grams of the green xylitol coated pellets of Example 1 were polished with 1gram of the wax/color blend for 15 minutes in the cloth-coated polishing pan used in Example 2.

EXAMPLE 4

45 grams of melted carnauba wax were blended with 5 grams of the green colorant used in Example 1. After cooling, this #10% color/wax blend was ground to pass through a #100 mesh sieve. 750 grams of the green xylitol coated pellets of Example 1 were polished with 1 gram of the wax/color blend for 15 minutes in the cloth.coated polishing pan used in Example 2.

Twelve judges were asked to rate the overall appearance on a 1–10 scale (being poor, 10 being excellent) for the pellets of Examples 1 through 4. Average ratings were:

Example 1–2.06 (no polish)
Example 2–3.54 (wax only)
Example 3–5.60 (5% color in wax)
Example 4–6.67 (10% color in wax)

The color was judged to be cleaner and more even in Examples 3 and 4. The coating appeared also to be more even and smoother, with less coating imperfections for the colored wax polished samples, even though color was not significantly changed.

EXAMPLE 5 (COMPARATIVE)

On a production scale, 100 kg of green colorant xylitol pellets of Example 1 were polished with 25 grams of carnauba wax pulverized to pass at least 99% through a #100 mesh sieve.

EXAMPLE 6

The powdered carnauba wax used in Example 5 was powder blended with the powdered green colorant of titanium dioxide, FD&C Blue #1 and FD&C Yellow #5 used in Example 3 at a ratio of 1:9 color/wax. The green colorant was sized so that at least 99.9% passed through a #325 mesh sieve (less than 45 microns). On a production scale, 100 kg of the green colored pellets of Example 1 were polished with 28 grams of colored wax blend.

Evaluation of Example 5 compared to Example 6 indicated that although the color was the same intensity and hue, the overall appearance of the coating in terms of smoothness and evenness of coating with less imperfections was improved in Example 6. Example 5 also appeared to have a speckled, white, dusty appearance, whereas Example 6 did not.

In a separate visual evaluation test, twelve judges were asked to rate the overall appearance on a 1–1.0 scale, as above, for the pellets of Examples 2, 4, 5 and 6. Average ratings were:

Example 2–2.87 (wax only)
Example 4–4.9 (10% color in wax)
Example 5–6.25 (wax only, production scale)
Example 6–8.54 (10% color in wax, production scale)

The color was judged to be cleaner and more even for the colored wax samples. The coating was more even and smoother, with less coating imperfections using colored wax.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes that come within the meaning and range of equivalency of the claims are to be embraced within their scope.

We claim:

1. A coated chewing gum product comprising:
   (a) a gum center;
   (b) a colored coating surrounding the gum center; and
   (c) a polishing layer applied to the surface of the colored coating, the polishing layer comprising a wax and a colorant.

2. The coated chewing gum product of claim 1 wherein the colored coating comprises a sugarless sweetener selected from the group consisting of sorbitol, mannitol, xylitol, hydrogenated starch hydrolysates, maltitol and combinations thereof.

3. The coated chewing gum product of claim 1 wherein the wax in the polishing layer is selected from the group consisting of carnauba wax, beeswax, candelilla wax, spermaceti wax, and mixtures thereof.

4. The coated chewing gum product of claim 1 wherein the colorant comprises a lake.

5. The coated chewing gum product of claim 1 wherein the ratio of wax to colorant in the polishing layer is between about 99:1 and about 7:3.

6. The coated chewing gum product of claim 1 where the ratio of wax to colorant in the polishing layer is between about 19:1 and about 17:3.

7. The coated chewing gum product of claim 1 wherein the polishing layer comprises between about 0.005% and about 0.2% of the coated product.

8. The coated chewing gum product of claim 1 wherein the polishing layer comprises between about 0.01% and about 0.05% of the coated product.

9. A method for making coated chewing gum products comprising the steps of:
   (a) providing a gum center;
   (b) coating the gum center with a colored coating; and
   (c) applying a polishing layer comprising a wax and a colorant to the colored coating.

10. The method of claim 9 wherein the colored coating is applied in a hard panning process.

11. The method of claim 9 wherein the polishing layer is prepared by melting the wax, adding the colorant to the molten wax, solidifying the colored wax and grinding the colored wax into fine particles.

12. The method of claim 9 wherein the polishing layer is prepared by blending powdered wax and a powdered colorant.

13. The method of claim 11 wherein the colored wax is ground to a particle size so that it will pass at least 99% through a #100 mesh sieve.

14. The method of claim 12 wherein the blend of powdered wax and powdered colorant will pass at least 99% through a #100 mesh sieve.

15. The method of claim 9 wherein the polishing layer is applied by dusting the colored coated gum centers with a powdered, colored wax and tumbling the gum product in a coating pan.

16. The method of claim 9 wherein the colored coating comprises a sugarless sweetener selected from the group consisting of sorbitol, mannitol, xylitol, hydrogenated starch hydrolysates, maltitol and combinations thereof.

17. A method of making a coated chewing gum product comprising the steps of:
   (a) providing a chewing gum center;
   (b) coating the gum center with a colored, sugarless coating in a hard panning process; and
   (c) applying a powdered, colored wax to the coated gum centers to provide a polishing layer comprising about 0.005% to about 0.2% of the coated product.

18. The method of claim 17 wherein the powdered, colored wax comprises about 1% to about 30% of a lake color and about 70% about 99% of a wax.

19. The method of claim 17 wherein the powdered, colored wax has a particle size to pass at least 99% through a #100 mesh sieve.

20. The method of claim 17 wherein the colored, sugarless coating is formed by applying colored aqueous solutions comprising xylitol and gum arabic to the gum centers in successive application and drying the solution between applications.

* * * * *

UNITED STATES PATENT AND TRADEMARK OFFICE
CERTIFICATE OF CORRECTION

PATENT NO. : 5,171,589
DATED : December 15, 1992
INVENTOR(S) : LINDELL C. RICHEY et al.

It is certified that error appears in the above-identified patent and that said Letters Patent is hereby corrected as shown below:

<u>ON THE TITLE PAGE</u>, item [54], and

Column 1, in the title, in the first line, please delete "GUN" and substitute therefor --GUM--.

Column 1, line 24, after "recent" please insert --past--.

Column 1, lines 31-32, please delete "* Registered Trademark of Palatinit Sussungsmittel GmbH".

Column 1, after line 68, please insert a footnote --* Registered Trademark of Palatinit Sussungsmittel GmbH--.

Column 2, line 21, after "such" please insert --as--.

Column 2, line 27, please delete "Zamudio. Tena" and substitute therefor --Zamudio-Tena--.

Column 2, line 36, please delete "Dogliotii" and substitute therefor --Dogliotti--.

Column 5, line 29, please delete "70.99%" and substitute therefor --70-99%--.

Column 5, line 30, please delete "preferably" and substitute therefor --preferable--.

UNITED STATES PATENT AND TRADEMARK OFFICE
CERTIFICATE OF CORRECTION

PATENT NO. : 5,171,589
DATED : December 15, 1992
INVENTOR(S) : LINDELL C. RICHEY et al.

It is certified that error appears in the above-identified patent and that said Letters Patent is hereby corrected as shown below:

Column 6, line 19, please delete "1gram" and substitute therefor --1 gram--.

Column 6, line 29, please delete "cloth.coated" and substitute therefor --cloth-coated--.

Column 6, line 31, before "being poor" please insert --1--.

Column 6, line 68, please delete "1-1.0" and substitute therefor --1-10--.

Column 7, line 4, please delete "4-4.9" and substitute therefor --4-4.91--.

Column 8,

Claim 18, line 3, after "70%" please insert --to--.

Signed and Sealed this

Twenty-sixth Day of April, 1994

BRUCE LEHMAN

*Attest:*

*Attesting Officer*          *Commissioner of Patents and Trademarks*